United States Patent [19]
Mattson

[11] Patent Number: 5,962,355
[45] Date of Patent: Oct. 5, 1999

[54] GLASS COMPOSITIONS HAVING HIGH KI VALUES AND FIBERS THEREFROM

[75] Inventor: Stephanie M. Mattson, Newark, Ohio

[73] Assignee: Owens Corning Fiberglas Technology, Inc., Summit, Ill.

[21] Appl. No.: 08/935,168

[22] Filed: Sep. 22, 1997

Related U.S. Application Data

[63] Continuation of application No. 08/637,316, Apr. 24, 1996, abandoned.

[51] Int. Cl.$^6$ .............................. C03C 13/06; C03C 3/091
[52] U.S. Cl. ................................ 501/36; 501/35; 501/66; 501/69; 501/70
[58] Field of Search .................................. 501/35, 38, 65, 501/68, 36, 66, 69, 70

[56] References Cited

U.S. PATENT DOCUMENTS

| | | | |
|---|---|---|---|
| Re. 29,388 | 9/1977 | Atkinson | 106/50 |
| Re. 35,557 | 7/1997 | Thelohan et al. | 501/11 |
| 1,913,242 | 6/1933 | McClure . | |
| 2,192,939 | 3/1940 | Slayter et al. . | |
| 2,308,857 | 1/1943 | Bowes | 106/50 |
| 2,426,472 | 8/1947 | Stanworth | 106/54 |
| 2,877,124 | 3/1959 | Welsch | 501/38 |
| 2,882,173 | 4/1959 | Welsch | 106/54 |
| 3,008,841 | 11/1961 | Tiede | 106/54 |
| 3,013,888 | 12/1961 | de Lajarte | 106/50 |
| 3,060,041 | 10/1962 | Loewenstein | 106/50 |
| 3,151,966 | 10/1964 | Slayter | 65/22 |
| 3,328,142 | 6/1967 | Lévecque | 65/4 |
| 3,513,002 | 5/1970 | Labino | 106/50 |
| 3,736,162 | 5/1973 | Chvalovsky et al. | 106/99 |
| 3,753,674 | 8/1973 | Ohlberg et al. | 65/114 |
| 3,764,283 | 10/1973 | Hagedorn | 65/33 |
| 3,817,764 | 6/1974 | Wolf | 106/50 |
| 3,853,569 | 12/1974 | Laurent et al. | 501/35 |

(List continued on next page.)

FOREIGN PATENT DOCUMENTS

| | | |
|---|---|---|
| 0 009 418 | 4/1980 | European Pat. Off. . |
| 0 019 600 | 11/1980 | European Pat. Off. . |
| 0 206 726 | 12/1986 | European Pat. Off. . |
| 0 247 817 | 12/1987 | European Pat. Off. . |
| 0 319 578 | 6/1989 | European Pat. Off. . |
| 0399320 | 5/1990 | European Pat. Off. . |
| 0412878 | 8/1990 | European Pat. Off. . |
| 0588251 | 9/1993 | European Pat. Off. . |
| 0 591 696 A1 | 4/1994 | European Pat. Off. . |
| 0 459 897 B1 | 4/1995 | European Pat. Off. . |
| 0 739 862 A2 | 10/1996 | European Pat. Off. . |
| 4417230 | 11/1995 | Germany . |
| 72-117753 | 11/1972 | Japan . |
| 73-101799 | 9/1973 | Japan . |
| 73-130550 | 11/1973 | Japan . |
| 80-2913604 | 2/1980 | U.S.S.R. . |
| 86-4071881 | 5/1986 | U.S.S.R. . |
| 1 726 411 A1 | 4/1992 | U.S.S.R. . |
| 811243 | 4/1959 | United Kingdom ...... 501/35 |

(List continued on next page.)

OTHER PUBLICATIONS

C.R. DAS and R.W. Douglas, "Studies on the Reaction Between Water and Glass. Part 3," Physics and Chemistry of Glasses, vol. 8, No. 5, Oct. 1967, pp. 178–184.

Hironori Ohta and Yoshiro Suzuki, "Chemical Durability of Glasses in the Systems $SiO_2$–$CaO$–$Na_2O$–$R_mO_n$" Ceramic Bulletin. vol. 57, No. 6, 1978, pp. 602–604.

C.M. Jantzen and M.J. Plodinec, "Thermodynamic Model of Natural, Medieval and Nuclear Waste Glass Durability," Journal of Non–Crystalline Solids 67, 1984, pp. 207–223.

Nomenclature Committee of TIMA, Inc., "Nonmenclature of Man–Made Vitreous Fibers," Apr. 15, 1991, pp. 1–72.

Stephanie M. Mattson, "Glass Fiber Dissolution in Simulated Lung Fluid and Measures Needed to Improve Consistency and Correspondence to In Vivo Dissolution," vol. 102, Supplement 5, Oct. 1994, pp. 87–90.

Stephanie M. Mattson, "Glass Fibres in Simulated Lung Fluid: Dissolution Behavior and Analytical Requirements," Ann. Occup. Hyg., vol. 38, No. 6, 1994, pp. 857–877.

"Biological Effects of Man–Made Mineral Fibres," vol. 2, Sessions VI–IX and annexes, Apr. 20–22, 1982, pp. 26–99 and Figs. 3–4.

Chemical Abstracts, vol. 84, 1976. p. 306.

N.K. Mitra, M. Mukherjee and M. Samanta, "Effect of Minor Substitution of $SiO2$ in the $Na2O$–$SiO2$ Glass on the Leaching Characteristics in Aqueous Medium," vol. 13, No. 4, Jul. 1968, pp. 98–102.

"Scientific Basis for Nuclear Waste Management VII" Materials Research Society Symposia Proceedings, Nov. 1983, vol. 26, pp. 755–761.

Hironori Ohta and Yoshiro Suzuki, "Chemical Durability of Glasses in the Systems $SiO_2$–$CaO$–$Na_2O$–$R_mO_{n,}$" pp. 602–604.

V.R. Christensen, S. Lund Jensen, M. Guldberg, and O. Kamstrup, "Effect of Chemical Composition of Man–Made Vitreous Fibers on the Rate of Dissolution In Vitro at Different pHs," vol. 102, Supplement 5, Oct. 1994, pp. 83–86.

Örjan H. Andersson, Kaj H. Karlsson, Kan Kangasniemi, Anti Yli–Urpo, "Models for Physical Properties and Bioactivity of Phosphate Opal Glasses," Glastech, Ber. 61 (1988) Nr. 10, pp. 300–304.

G.A. Cox, B.A. Ford, "The Corrosion of Glass on the Sea Bed," Journal of Materials Science 24 (1989) pp. 3146–3153.

(List continued on next page.)

Primary Examiner—Karl Group
Attorney, Agent, or Firm—Stephen W. Barns

[57] ABSTRACT

A fiberizable glass composition which has a KI value $\geq 40$, while possessing acceptable processing properties such as viscosity and liquidus temperatures is provided. The glass composition processes well in the furnace with acceptably low levels of foaming and is readily fiberizable. The glass has a high boron content, a high soda content, and contains only small amounts of alumina. Further, the glass contains small amounts of barium sulfate which improves the durability of the glass fibers in use.

24 Claims, No Drawings

U.S. PATENT DOCUMENTS

| | | | |
|---|---|---|---|
| 4,090,882 | 5/1978 | Rauschenfels | 106/99 |
| 4,106,946 | 8/1978 | Ritze | 106/52 |
| 4,120,730 | 10/1978 | Trojer et al. | 106/39.6 |
| 4,131,597 | 12/1978 | Blüthgen et al. | 260/42.18 |
| 4,142,907 | 3/1979 | Manring et al. | 106/52 |
| 4,159,358 | 6/1979 | Hench et al. | 427/318 |
| 4,171,544 | 10/1979 | Hench et al. | 3/1.9 |
| 4,177,077 | 12/1979 | Gagin | 501/35 |
| 4,179,300 | 12/1979 | Sagara | 106/47 Q |
| 4,189,325 | 2/1980 | Barrett et al. | 106/35 |
| 4,234,972 | 11/1980 | Hench et al. | 3/1.9 |
| 4,239,113 | 12/1980 | Gross et al. | 206/568 |
| 4,243,421 | 1/1981 | Kume | 106/50 |
| 4,264,131 | 4/1981 | Sawamura et al. | 350/96.34 |
| 4,277,286 | 7/1981 | Boyd et al. | 106/52 |
| 4,312,952 | 1/1982 | Carbol | 501/36 |
| 4,325,724 | 4/1982 | Froberg | 65/121 |
| 4,381,347 | 4/1983 | Carbol | 501/36 |
| 4,437,192 | 3/1984 | Fujiu et al. | 3/1.9 |
| 4,451,276 | 5/1984 | Barthe et al. | 65/6 |
| 4,454,238 | 6/1984 | Hobson et al. | 501/38 |
| 4,497,629 | 2/1985 | Ogino et al. | 433/201 |
| 4,552,850 | 11/1985 | Partington et al. | 501/37 |
| 4,562,161 | 12/1985 | Mennemann et al. | 501/59 |
| 4,604,097 | 8/1986 | Graves, Jr. et al. | 623/11 |
| 4,605,415 | 8/1986 | Richez | 623/16 |
| 4,608,350 | 8/1986 | Howard, Jr. | 501/20 |
| 4,615,988 | 10/1986 | Le Moigne et al. | 501/30 |
| 4,652,534 | 3/1987 | Kasuga | 501/5 |
| 4,652,535 | 3/1987 | Mackenzie et al. | 501/27 |
| 4,655,777 | 4/1987 | Dunn et al. | 623/16 |
| 4,756,732 | 7/1988 | Barthe et al. | 65/6 |
| 4,759,785 | 7/1988 | Barthe et al. | 65/6 |
| 4,759,974 | 7/1988 | Barthe et al. | 428/224 |
| 4,768,859 | 9/1988 | Kasori et al. | 350/96.34 |
| 4,775,646 | 10/1988 | Hench et al. | 501/2 |
| 4,851,046 | 7/1989 | Low et al. | 106/35 |
| 4,867,779 | 9/1989 | Meunier et al. | 71/62 |
| 5,013,323 | 5/1991 | Kobayashi et al. | 623/16 |
| 5,037,470 | 8/1991 | Matzen et al. | 71/52 |
| 5,055,428 | 10/1991 | Potter | 501/35 |
| 5,108,957 | 4/1992 | Cohen et al. | 501/35 |
| 5,108,975 | 4/1992 | Schubert et al. | 502/224 |
| 5,120,340 | 6/1992 | Ducheyne et al. | 65/18.3 |
| 5,121,748 | 6/1992 | Ditz et al. | 128/631 |
| 5,206,100 | 4/1993 | Muto et al. | 429/247 |
| 5,215,563 | 6/1993 | LaCourse et al. | 65/2 |
| 5,250,488 | 10/1993 | Thelochan et al. | 501/306 |
| 5,296,026 | 3/1994 | Monroe et al. | 106/35 |
| 5,312,806 | 5/1994 | Mogensen | 501/36 |
| 5,332,698 | 7/1994 | Nyssen et al. | 501/35 |
| 5,332,699 | 7/1994 | Olds et al. | 501/36 |
| 5,346,864 | 9/1994 | Maugendre et al. | 501/35 |
| 5,401,693 | 3/1995 | Bauer et al. | 501/38 |
| 5,420,082 | 5/1995 | Maugendre et al. | 501/35 |
| 5,429,996 | 7/1995 | Kaneko | 501/35 |
| 5,523,264 | 6/1996 | Mattson | 501/35 |
| 5,523,265 | 6/1996 | Rapp et al. | 501/35 |
| 5,614,449 | 3/1997 | Jensen | 501/38 |
| 5,691,255 | 11/1997 | Jensen et al. | 501/36 |
| 3,922,155 | 11/1975 | Broemer et al. | 65/33 |
| 3,981,736 | 9/1976 | Broemer et al. | 106/39.6 |

FOREIGN PATENT DOCUMENTS

| | | | |
|---|---|---|---|
| 1096465 | 12/1967 | United Kingdom . | |
| 2025928 | 1/1980 | United Kingdom | 501/35 |
| 2 041 910 | 9/1980 | United Kingdom . | |
| 2 080 281 | 2/1982 | United Kingdom . | |
| 2 178 422 | 2/1987 | United Kingdom . | |
| 2 220 654 | 1/1990 | United Kingdom . | |
| 2 279 942 | 1/1995 | United Kingdom . | |
| WO 86/04807 | 8/1986 | WIPO . | |
| WO 87/05007 | 8/1987 | WIPO . | |
| WO 89/12032 | 12/1989 | WIPO . | |
| WO 90/02713 | 3/1990 | WIPO . | |
| WO 91/11403 | 8/1991 | WIPO . | |
| WO 92/05121 | 4/1992 | WIPO . | |
| WO 93/15028 | 8/1993 | WIPO . | |
| WO 93/22251 | 11/1993 | WIPO . | |
| WO 94/14717 | 7/1994 | WIPO . | |
| WO 94/14718 | 7/1994 | WIPO . | |
| WO 94/15883 | 7/1994 | WIPO . | |
| WO 94/18134 | 8/1994 | WIPO . | |
| WO 95/01941 | 1/1995 | WIPO . | |
| WO 95/12554 | 5/1995 | WIPO . | |
| WO 95/21799 | 8/1995 | WIPO . | |
| WO 95/29135 | 11/1995 | WIPO . | |
| WO95/31411 | 11/1995 | WIPO . | |
| WO 95/34514 | 12/1995 | WIPO . | |
| WO95/32925 | 12/1995 | WIPO . | |
| WO95/32926 | 12/1995 | WIPO . | |
| WO95/32927 | 12/1995 | WIPO . | |
| WO95/35265 | 12/1995 | WIPO . | |
| WO 96/00196 | 1/1996 | WIPO . | |
| WO 96/01793 | 1/1996 | WIPO . | |
| WO 96/04213 | 2/1996 | WIPO . | |
| WO 92/09536 | 6/1996 | WIPO . | |
| WO 96/30313 | 10/1996 | WIPO . | |
| WO 96/34836 | 11/1996 | WIPO . | |

OTHER PUBLICATIONS

F. Pott et al, "*Nato Advanced Research Workshop on Mechanisms in Fibre Carcinogenesis*," Albuquerque, NM, Oct. 22–25, 1990, pp. 1–6.

B. Bellmann et al., "*Study on the Durability of Chemically Different Glass Fibres in Lungs of Rats,*" Zbl. Hyg. 190, (1990), pp. 310–314.

F. Pott et al., "*Carcinogenicity of Glass Fibres with Different Durability,*" Zbl. Hyg., 189, (1990), pp. 563–566.

R. Potter and Stephanie M. Mattson, "*Glass Fiber Dissolution in a Physiological Saline Solution,*" Glastechnische Berichte 64 (1991) Jan., No. 1, Frankfurt, DE, pp. 16–28.

Draft "*TRGS 906*", "*Justification for the Classification of Types of Inorganic Fibre Dust (Excluding Asbestos),*" pp. 1–28.

"*Inorganic Fibers,*" C.Z. Carroll–Potczynski, 1958, p. 125, U.S. Bureau of Mines.

"Erfahrungsaustausch," Martin Hübacher, Siikattechn, 20, 1960, No. 2, pp. 88–90.

Jon F. Bauer, "*Solubility and Durability of Manmade Mineral Fibers in Physiological Fluids,*" Presented at TAPPI Non–Wovens Conference, Nashville, Ohio, 1988, pp. 1–8.

Z.M. Syritakaya et al., "*Glasses Free From Alkali and Borates for Machine Working,*" Institute of Glass, p. 289.

Thomas D. Callinan and Robert T. Lucas, "*Some Special Fiber Glass Compositions,*" Research Digest, Oct. 1954.

"The role of gases melting processes," *Glastech. Ber Glass Science Technology,* vol. 68, No. 12 (1995), pp. 369–380.

"Foaming in Glass Melts in Produced by Sodium Sulfate Decomposition under Isothermal Conditions," *Journal of American Ceramics Society,* vol. 74, No. 3 (1991), pp. 551–555.

GLASS COMPOSITIONS HAVING HIGH KI VALUES AND FIBERS THEREFROM

CROSS-REFERENCE TO RELATED APPLICATION(S)

This is a continuation of U.S. patent application Ser. No. 08/637,316, filed Apr. 24, 1996 now abandoned.

TECHNICAL FIELD

The present invention relates to soda lime borosilicate glass compositions having high KI values, and fibers made from these compositions which are suitable for use as glass fiber insulation.

BACKGROUND OF THE INVENTION

Glass fiber insulation is well known and has been a commercial product for many years. Generally, the insulation is made from intertwined soda lime alumina borosilicate glass fibers which are held together with a binder. The binder may be any suitable material but quite commonly is a phenol-formaldehyde resin or a urea formaldehyde resin. These binders are well known, and a spray nozzle generally applies them to the glass fibers as hot gases attenuate the fibers from a rotating device, commonly called a spinner. A conveyer collects the binder-coated fibers in the form of a blanket or batt, and heat cures the blanket to produce the final insulation. The process produces various densities by varying the conveyor speed and the thickness of the cured insulation.

It is well established that asbestos fibers when inhaled can cause significant disease in man. Though the exact mechanism responsible for the biological activity of inhaled asbestos fibers is unknown, it is widely believed that their ability to remain in the lung for extended periods of time is an important factor. Glass fibers have not been linked to disease in man. Additionally, their durability or residence time in the lung appears much less than asbestos fibers. Despite this, certain countries such as Germany have proposed regulations for the use of glass fibers in insulation products. Glass fiber compositions meeting these proposed regulations are considered to be free of suspicion and can be used for both commercial and residential installations. The problem, however, for the manufacturer is to produce glass fibers which meet the proposed regulations and standard criteria. These glasses must be fiberizable in standard wool processes, have sufficient durability in use, and have acceptable insulating properties while still meeting the compositional requirements of the proposed regulations. The proposed German regulations require that glass fibers have a numerical index (KI) greater than or equal to 40 to be considered to be free of suspicion. This index is described by the equation:

$$KI = \Sigma(Na_2O, K_2O, CaO, MgO, BaO, B_2O_3) - 2(Al_2O_3),$$

where the values for each oxide are reported as a number corresponding to the weight percentage of that oxide in the glass composition. This requirement places severe constraints on the compositions of the glass, especially on the levels of alumina and silica in the glass composition. While one obvious attempt to meet the requirements is to reduce the level of alumina in the glass composition, such glasses tend to have poor durabilities and are difficult or impossible to fiberize by standard processes.

Recently, a number of glasses have been reported as having improved biosolubility or biodegradability. For example, Potter, U.S. Pat. No. 5,055,428, Cohen et al, U.S. Pat. No. 5,108,957, Nyssen, U.S. Pat. No. 5,332,698, and Bauer et al, U.S. Pat. No. 5,401,693, all describe glass fibers having low alumina contents and which are taught to have improved biosolubility. Additionally, published PCT applications WO 95/31411, WO 95/32925, WO 95/32926, WO 95/32927, and WO 95/35265 and published German application DE 4417230 have reported glass compositions which are said to have increased biodegradability and also meet the requirement of a KI value of $\geq 40$. However, processing and performance problems remain. Accordingly, there is still a need in this art for a glass composition which has a KI value $\geq 40$, while possessing acceptable processing properties such as viscosity and liquidus temperatures as well as acceptable durability in use.

DISCLOSURE OF THE INVENTION

The present invention meets those needs by providing a glass composition which has a KI value $\geq 40$, while possessing acceptable processing properties such as viscosity and liquidus temperatures as well as acceptable durability in use. Further, the glasses process well in the furnace with acceptably low levels of foaming. The glasses have a high boron content, a high soda content, and contain only small amounts of alumina. Further, the glasses contain small amounts, less than about 1.5% by weight, of barium sulfate ($BaSO_4$, reported as $BaO + SO_3$). The glass composition has the following ranges of major components:

| Ingredient | Weight Percent |
| --- | --- |
| $SiO_2$ | 53.0 to 58.0 |
| $Al_2O_3$ | 0.75 to 2.0 |
| CaO + MgO | 6.0 to 14.0 |
| $Na_2O + K_2O$ | 14.0 to 22.0 |
| $B_2O_3$ | 10.0 to 14.0 |
| BaO | 0.5 to <1.0 |
| $SO_3$ | 0 to 0.5 |

Standard wool processes including forming from bushings and from rotary spinners easily produce fibers from this composition. Generally, the difference (delta T) between the log 3 temperature and the liquidus temperature should be 200° F. or higher to enable easy fiber formation. Durability, as measured by fiber weight loss, is less than 5% of the total fiber weight after 24 hours of exposure to hot water. The presence of small amounts of barium oxide improves glass properties including durability, and the use of barium sulfate as a source of the barium oxide in the glass provides an inexpensive and nontoxic component.

The glasses of the present invention also have acceptable insulating properties. The glass fibers may be collected and formed into standard insulation products in the shape of wool batts using conventional processes. Wool batts made from glass fibers of the present invention have acceptable insulative values and compression (recovery) properties.

BEST MODE OF CARRYING OUT INVENTION

Measurements of viscosity, liquidus and durability for a number of glasses with KI $\geq 40$ were made using standard techniques and are reported in the Table below. Those measurements indicated a compositional region of glasses which are useful for production of glass fiber insulation. Such glasses have a numerical index (KI) of $\geq 40$ and can be fiberized easily using conventional processes. The difference (delta T) between the log 3 temperature and the liquidus temperature is generally 200° F. or higher. Durability as shown by fiber weight loss is less than 5% of total fiber weight after 24 hours of exposure to hot water.

This range is as follows for the major components:

| Ingredient | Weight Percent |
| --- | --- |
| $SiO_2$ | 53.0 to 58.0 |
| $Al_2O_3$ | 0.75 to 2.0 |
| CaO + MgO | 6.0 to 14.0 |
| $Na_2O + K_2O$ | 14.0 to 22.0 |
| $B_2O_3$ | 10.0 to 14.0 |
| BaO | 0.5 to <1.0 |
| $SO_3$ | 0 to 0.5 |

A more preferable range for the major components is as follows:

| Ingredient | Weight Percent |
| --- | --- |
| $SiO_2$ | 53.0 to <57.0 |
| $Al_2O_3$ | 0.50 to 1.5 |
| CaO + MgO | 6.0 to 14.0 |
| $Na_2O + K_2O$ | 14.0 to 22.0 |
| $B_2O_3$ | 10.0 to 14.0 |
| BaO | 0.5 to 0.8 |
| $SO_3$ | 0 to 0.5 |

By lowering the barium sulfate (reported as $BaO+SO_3$) content to less than about 1.5% by weight, foaming in the glass melting furnace was reduced to acceptable levels while still maintaining the benefits of barium oxide on the glass properties including better control of viscosity and liquidus temperature. Surprisingly, these levels of barium sulfate in the glass composition also have a positive effect on the durability of the glass. Further, using barium sulfate as a source of barium oxide for the glass composition lowers the cost of the glass as other sources of barium oxide such as BaO and $BaCO_3$ are more expensive and may present health issues because of their toxicity.

The glass composition may also contain less than 1% by weight of any or all of $Fe_2O_3$, $TiO_2$, or SrO. The total of all weight percentages of the components of the composition is, of course, 100%.

While PCT published applications WO 95/32925, WO 95/32926, and WO 95/32927 describe glass compositions which include barium oxide, the examples in these publications use barium oxide contents of 1.0% or greater. Further, while WO 95/32926 describes the effect of barium oxide on glass durability, the examples in that publication use greater amounts of barium oxide than the present invention. None of the publications suggests that barium sulfate may be used as an effective and inexpensive source of barium oxide in a glass composition.

Durabilities of the glasses of the present invention are shown in terms of percent fiber weight loss (% fwl) after one day (1 D) exposure to water at 205° F. Conventional glass compositions used in the manufacture of fiberized insulation lose up to 3.9% in 24 hours. Another important property is shown as delta T, the difference between the log 3 temperature and the liquidus temperature of the glass. A normal constraint is a delta T of 200° F. In some cases, this possibly may be lowered to 150° F. or 175° F. However, further lowering of delta T would require spinner modification to form fibers. The glass compositions shown meet this delta T of at least 200° F. constraint. Glasses with alternative compositions are suggested by the data which generally meet the criteria. All the glasses had a numerical index of 40 or higher.

TABLE 1

| Ingredients | Glass No. 1 | Glass No. 2 |
| --- | --- | --- |
| $SiO_2$ | 56.19 | 56.2 |
| $Al_2O_3$ | 1.1 | 1.1 |
| CaO | 7.4 | 7.58 |
| MgO | 3.47 | 3.0 |
| $Na_2O$ | 18.0 | 18.0 |
| $K_2O$ | 0.48 | 0.48 |
| $B_2O_3$ | 12.28 | 12.56 |
| $Fe_2O_3$ | 0.14 | 0.14 |
| BaO | 0.7 | 0.7 |
| $TiO_2$ | 0.049 | 0.049 |
| $SO_3$ | 0.14 | 0.14 |
| SrO | 0.048 | 0.048 |
| Log 3 viscosity (° F.) | 1680 | 1679 |
| Liquidus (° F.) | 1391 | 1417 |
| KI | 40.13 | 40.12 |
| delta T | 289 | 262 |
| Durability (%) fwl after one day* | 4.82 ± 0.11 | 4.63 ± 0.30 |

*Exposure to water at 205° F.

While certain representative embodiments and details have been shown for purposes of illustrating the invention, it will be apparent to those skilled in the art that various changes in the embodiments and features disclosed herein may be made without departing from the scope of the invention, which is defined in the appended claims.

I claim:

1. A fiberizable glass composition suitable for insulation consisting essentially of:

| Ingredient | Weight Percent |
| --- | --- |
| $SiO_2$ | 53.0 to 58.0 |
| $Al_2O_3$ | 0.75 to 2.0 |
| CaO + MgO | 6.0 to 14.0 |
| $Na_2O + K_2O$ | 14.0 to 22.0 |
| $B_2O_3$ | 10.0 to 14.0 |
| BaO | 0.5 to <1.0 |
| $SO_3$ | greater than 0 to 0.5 | wherein the glass composition has a KI value equal to or greater than 40 and barium sulfate is used as a source of said BaO in said glass composition.

2. The fiberizable glass composition according to claim 1, wherein $SiO_2$ is present in the range of from 53.0 to less than 57.0 percent by weight.

3. The fiberizable glass composition according to claim 1, wherein $Al_2O_3$ is present in the range of from 0.75 to 1.5 percent by weight.

4. The fiberizable glass composition according to claim 1, wherein BaO is present in the range of from 0.5 to 0.8 percent by weight.

5. The fiberizable glass composition according to claim 1, wherein said composition consists essentially of:

| Ingredient | Weight Percent |
| --- | --- |
| $SiO_2$ | 56.19 |
| $Al_2O_3$ | 1.1 |
| CaO + MgO | 10.87 |
| $Na_2O + K_2O$ | 18.48 |
| $B_2O_3$ | 12.28 |

-continued

| Ingredient | Weight Percent |
| --- | --- |
| BaO | 0.7 |
| $SO_3$ | 0.14. |

6. The fiberizable glass composition according to claim 1, wherein said composition consists essentially of:

| Ingredient | Weight Percent |
| --- | --- |
| $SiO_2$ | 56.2 |
| $Al_2O_3$ | 1.1 |
| CaO + MgO | 10.58 |
| $Na_2O + K_2O$ | 18.48 |
| $B_2O_3$ | 12.56 |
| BaO | 0.7 |
| $SO_3$ | 0.14 | wherein the source of said BaO in said composition is barium sulfate.

7. The fiberizable glass composition according to claim 1, wherein said composition also includes less than 1% by weight of any or all of $Fe_2O_3$, $TiO_2$, or SrO.

8. Glass fiber insulation comprising soda lime borosilicate glass fibers having a glass composition consisting essentially of:

| Ingredient | Weight Percent |
| --- | --- |
| $SiO_2$ | 53.0 to 58.0 |
| $Al_2O_3$ | 0.75 to 2.0 |
| CaO + MgO | 6.0 to 14.0 |
| $Na_2O + K_2O$ | 14.0 to 22.0 |
| $B_2O_3$ | 10.0 to 14.0 |
| BaO | 0.5 to <1.0 |
| $SO_3$ | greater than 0 to 0.5 | wherein the glass composition have a KI value equal to or greater than 40 and barium sulfate is used as a source of said BaO in said glass composition.

9. The glass fiber insulation according to claim 8, wherein said composition also includes less than 1% by weight of any or all of $Fe_2O_3$, $TiO_2$, or SrO.

10. A process for the preparation of a fiberizable glass composition suitable for insulation comprising the steps of providing a fiberizable glass composition consisting essentially of:

| Ingredient | Weight Percent |
| --- | --- |
| $SiO_2$ | 53.0 to 58.0 |
| $Al_2O_3$ | 0.75 to 2.0 |
| CaO + MgO | 6.0 to 14.0 |
| $Na_2O + K_2O$ | 14.0 to 22.0 |
| $B_2O_3$ | 10.0 to 14.0 |
| BaO | 0.5 to <1.0 |
| $SO_3$ | greater than 0 to 0.5 | wherein the glass composition has a KI value equal to or greater than 40 and barium sulfate is used as a source of said BaO in said glass composition, heating said composition to melt it, and fiberizing said glass composition.

11. The process according to claim 10, wherein said glass composition also includes less than 1% by weight of any or all of $Fe_2O_3$, $TiO_2$, or SrO.

12. The fiberizable glass composition according to claim 1, wherein the glass composition has a durability of less than 5% fiber weight loss based on a total fiber weight after 24 hours of exposure to hot water.

13. The fiberizable glass composition according to claim 1, wherein the glass composition has a log 3 temperature and a liquidus temperature differing by at least 200° F.

14. The glass fiber insulation according to claim 8, wherein the glass composition has a durability of less than 5% fiber weight loss based on the total fiber weight after 24 hours of exposure to hot water.

15. The glass fiber insulation according to claim 8, wherein the glass composition has a log 3 temperature and a liquidus temperature differing by at least 200° F.

16. A fiberizable glass composition comprising:

| Ingredient | Weight Percent |
| --- | --- |
| $SiO_2$ | 53.0 to 58.0 |
| $Al_2O_3$ | 0.75 to 2.0 |
| CaO + MgO | 6.0 to 14.0 |
| $Na_2O + K_2O$ | 14.0 to 22.0 |
| $B_2O_3$ | 10.0 to 14.0 |
| BaO | 0.5 to <1.0 |
| $SO_3$ | greater than 0 to 0.5 | wherein the glass composition has a KI value equal to or greater than 40 and barium sulfate is used as a source of said BaO in said composition.

17. The fiberizable glass composition according to claim 16, wherein $SiO_2$ is present in the range of from 53.0 to less than 57.0 percent by weight.

18. The fiberizable glass composition according to claim 16, wherein $Al_2O_3$ is present in the range of from 0.75 to 1.5 percent by weight.

19. The fiberizable glass composition according to claim 16, wherein BaO is present in the range of from 0.5 to 0.8 percent by weight.

20. The fiberizable glass composition according to claim 16, wherein said composition also includes less than 1% by weight of any or all of $Fe_2O_3$, $TiO_2$, or SrO.

21. The fiberizable glass composition according to claim 16, wherein the glass composition has a durability of less than 5% fiber weight loss based on a total fiber weight after 24 hours of exposure to hot water.

22. The fiberizable glass composition according to claim 21, wherein the glass composition has a log 3 temperature and a liquidus temperature differing by at least 150° F.

23. The fiberizable glass composition according to claim 22, wherein the glass composition has a log 3 temperature and a liquidus temperature differing by at least 200° F.

24. The fiberizable glass composition according to claim 16, wherein the glass composition has a log 3 temperature and a liquidus temperature differing by at least 200° F.

* * * * *